United States Patent
McIver et al.

(10) Patent No.: US 8,594,932 B2
(45) Date of Patent: Nov. 26, 2013

(54) MANAGEMENT SYSTEM FOR UNMANNED AERIAL VEHICLES

(75) Inventors: John L. McIver, Bothell, WA (US); Alan Eugene Bruce, Kent, WA (US); Daniel J. Gadler, Mercer Island, WA (US); Charles B. Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 12/881,292

(22) Filed: Sep. 14, 2010

(65) Prior Publication Data

US 2012/0065881 A1  Mar. 15, 2012

(51) Int. Cl.
*G01C 21/00* (2006.01)
*G06F 19/00* (2011.01)

(52) U.S. Cl.
USPC ............. 701/467; 701/117; 701/120; 701/14; 701/3; 701/4; 701/410; 701/411; 701/528

(58) Field of Classification Search
USPC ........... 701/117, 120, 14, 3, 4, 410, 411, 467, 701/528, 532, 533; 340/971, 973, 990, 340/995.19; 342/176, 179, 182, 183, 36, 38
See application file for complete search history.

(56) References Cited

U.S. PATENT DOCUMENTS

| 7,689,328 | B2 | 3/2010 | Spinelli | |
|---|---|---|---|---|
| 2007/0297374 | A1* | 12/2007 | El-Damhougy | 370/338 |
| 2007/0299794 | A1* | 12/2007 | El-Damhougy | 706/15 |
| 2007/0299946 | A1* | 12/2007 | El-Damhougy | 709/223 |
| 2007/0299947 | A1* | 12/2007 | El-Damhougy | 709/223 |
| 2008/0255757 | A1 | 10/2008 | Bruce et al. | |

OTHER PUBLICATIONS

U.S. Appl. No. 12/764,797, filed Apr. 21, 2010, Spinelli.

* cited by examiner

*Primary Examiner* — Ian Jen
(74) *Attorney, Agent, or Firm* — Yee & Associates, P.C.

(57) ABSTRACT

A method and apparatus for managing a flight of an aircraft. Conditions in an environment around the aircraft are monitored during the flight of the aircraft on a route having a number of target points. In response to detecting a condition requiring a change to the route of the aircraft, current resources for the aircraft are identified. A determination is made as to whether changing the route reduces the number of target points that can be reached based on the current resources for the aircraft. In response to a determination that changing the route reduces the number of target points that can be reached, the route is changed to include a portion of the number of target points using the condition and a policy.

27 Claims, 10 Drawing Sheets

MANAGEMENT SYSTEM FOR UNMANNED AERIAL VEHICLES

BACKGROUND INFORMATION

1. Field

The present disclosure relates generally to aircraft and, in particular, to a method and apparatus for managing aircraft. Still more particularly, the present disclosure relates to a method and apparatus for managing an unmanned aerial vehicle during flight.

2. Background

Unmanned aerial vehicles are aircraft that fly without a human operator onboard the aircraft. Unmanned aerial vehicles are used for a number of different purposes. Unmanned aerial vehicles may be used by military organizations to perform surveillance, reconnaissance, target acquisition, attacks on targets, and other suitable operations. Additionally, unmanned aerial vehicles also may be used in non-military applications. These applications include firefighting, security, and/or other suitable types of operations.

Unmanned aerial vehicles may have many different shapes, sizes, configurations, and characteristics. Unmanned aerial vehicles may be controlled from a remote location or fly autonomously using a program with a flight plan run by the program on the unmanned aerial vehicle.

Depending on the conditions encountered during a mission performed by an unmanned aerial vehicle, increased challenges in the survivability and performance of the mission may be present. For example, with respect to survivability, an unmanned aerial vehicle may perform a mission at lower altitudes in hostile environments. An unmanned aerial vehicle may have to deviate from a desired route to avoid exposure to threats that may damage or destroy the unmanned aerial vehicle. These threats also may include jamming or other interruptions in the communications links used by the unmanned aerial vehicle.

Additionally, missions may include multiple waypoints through which an unmanned aerial vehicle may fly. The unmanned aerial vehicle may collect information or perform other operations at or near these waypoints. When a hostile environment is present, the route of the unmanned aerial vehicle may change such that reaching the different waypoints to perform operations may be unfeasible with respect to the resources of the unmanned aerial vehicle, such as fuel.

Currently, unmanned aerial vehicles may fly a route using the waypoints that may be followed. These waypoints may include points other than those used to perform different operations. A remote operator may interrupt the route being flown by the unmanned aerial vehicle to take into account hostile environments. Additionally, the remote operator also may make other changes to the waypoints to take into account available resources.

This type of process requires the remote operator to monitor the unmanned aerial vehicle. The position of the unmanned aerial vehicle and information about potential hostile environments are used by the operator to determine whether changes are needed. These types of operations may take more time than desired, as well as require additional resources to operate the unmanned aerial vehicle.

Therefore, it would be advantageous to have a method and apparatus that takes into account one or more of the issues discussed above, as well as other issues.

SUMMARY

In one advantageous embodiment, a method is provided for managing a flight of an aircraft. Conditions in an environment around the aircraft are monitored during the flight of the aircraft on a route having a number of target points. In response to detecting a condition requiring a change to the route of the aircraft, current resources for the aircraft are identified. A determination is made as to whether changing the route reduces the number of target points that can be reached based on the current resources for the aircraft. In response to a determination that changing the route reduces the number of target points that can be reached, the route is changed to include a portion of the number of target points using the condition and a policy.

In another advantageous embodiment, an apparatus comprises an aircraft and a control system associated with the aircraft. The control system is configured to monitor for conditions in an environment around the aircraft during flight of the aircraft on a route having a number of target points. The control system is configured to identify current resources for the aircraft in response to detecting a condition requiring a change to the route of the aircraft. The control system is configured to determine whether changing the route reduces the number of target points that can be reached based on the current resources for the aircraft. The control system is configured to change the route to include a portion of the number of target points using the condition and a policy in response to a determination that changing the route reduces the number of target points that can be reached.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that the use of a remote operator for an unmanned aerial vehicle may be undesirable in certain situations. The different advantageous embodiments recognize and take into account that, in some cases, an environment may make communications between the remote operator and the unmanned aerial vehicle difficult or impossible. For example, jamming or other interruptions of unmanned aerial vehicle communications may make it impossible for the remote operator to change the route of an unmanned aerial vehicle.

The different advantageous embodiments recognize and take into account that the use of waypoints for correcting the flight of an unmanned aerial vehicle may allow the unmanned aerial vehicle to perform a mission without a remote operator. The different advantageous embodiments recognize and take into account, however, that other conditions may result in the unmanned aerial vehicle being unable to perform a mission, even with the use of a route containing waypoints. For example, an unmanned aerial vehicle may be damaged by hostile personnel when following a route programmed for the unmanned aerial vehicle.

The different advantageous embodiments recognize and take into account that it would be advantageous to provide an unmanned aerial vehicle with a capability to detect environmental conditions that may require a change to a route of the unmanned aerial vehicle to avoid or reduce the effects of an undesired environment. Further, the different advantageous embodiments also recognize and take into account that it would be desirable to provide an unmanned aerial vehicle with a capability to allocate resources in a manner to perform as much of a mission as possible if changes to a route are needed based on environmental conditions.

Thus, the different advantageous embodiments provide a method and apparatus for managing a flight of an aircraft. Conditions in an environment around the aircraft are monitored during the flight of the aircraft on a route having a number of target points. In response to detecting a condition requiring a change to the route of the aircraft, current resources for the aircraft are identified. A determination is made as to whether changing the route reduces the number of target points that can be reached based on the current resources for the aircraft. In response to a determination that changing the route reduces the number of target points that can be reached, the route is changed to include a portion of the number of target points using the condition and a policy.

Figure 1:
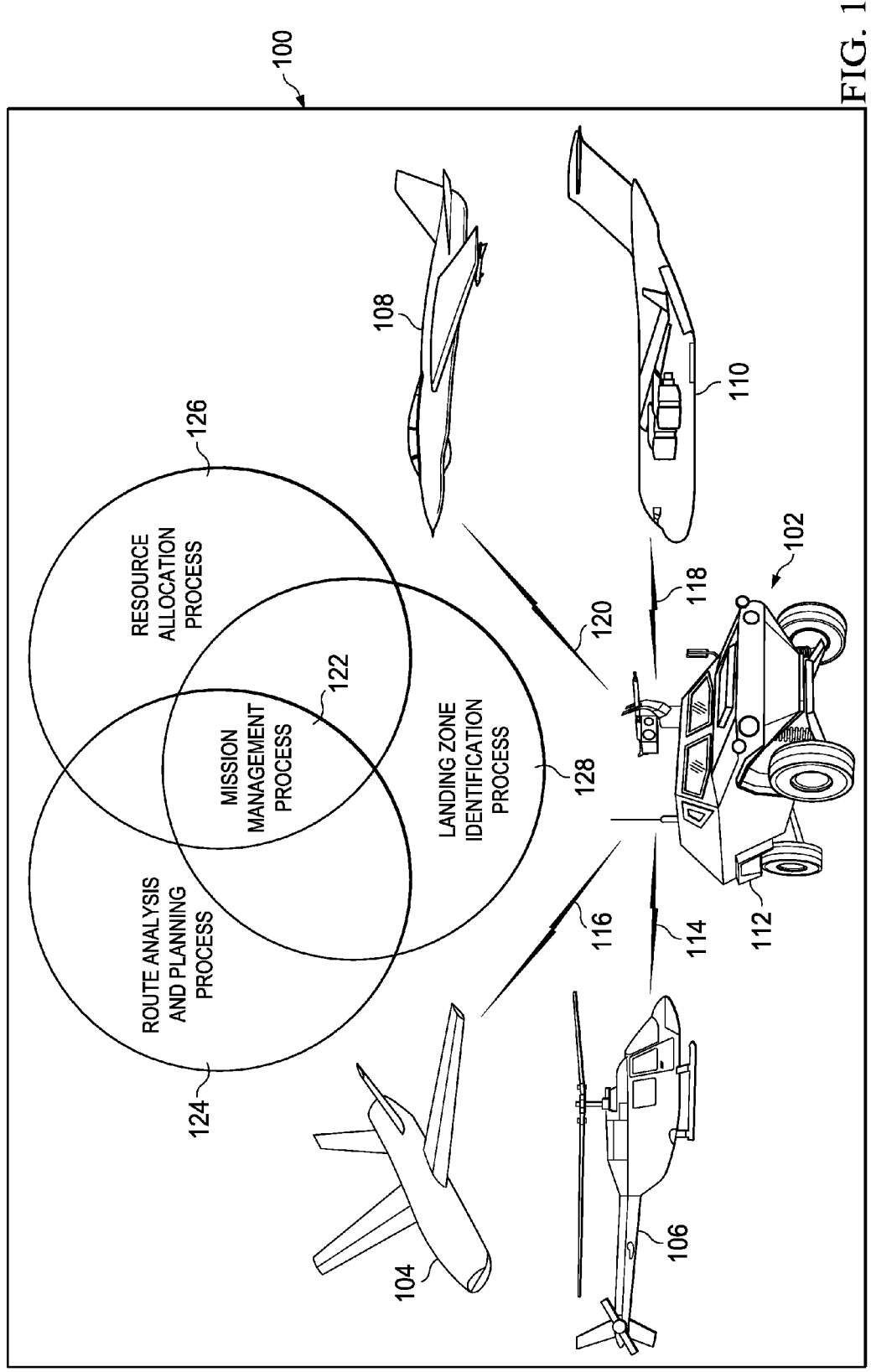
FIG. 1 is an illustration of a mission management environment in accordance with an advantageous embodiment.

With reference now to FIG. 1, an illustration of a mission management environment is depicted in accordance with an advantageous embodiment. In this illustrative example, mission management environment 100 includes control station 102, unmanned aerial vehicle 104, helicopter 106, aircraft 108, and aircraft 110.

As depicted, control station 102 takes the form of ground vehicle 112 in this example. An operator may use a control system associated with ground vehicle 112 to manage missions performed by at least one of unmanned aerial vehicle 104, helicopter 106, aircraft 108, and aircraft 110. In this illustrative example, a control system may be associated with ground vehicle 112 by being a computer system located in ground vehicle 112.

Further, as used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In this illustrative example, control system 102 exchanges information with unmanned aerial vehicle 104, helicopter 106, aircraft 108, and aircraft 110 using wireless communication links 116, 114, 120, and 118, respectively. This information is exchanged such that unmanned aerial vehicle 104, helicopter 106, aircraft 108, and aircraft 110 may use mission management process 122 to plan and manage missions.

Mission management process 122 is run on unmanned aerial vehicle 104, helicopter 106, aircraft 108, and aircraft 110. Further, in some illustrative examples, a portion of mission management process 122 may run on the control system in control station 102. A portion may be some or all of mission management process 122 in these illustrative examples.

As depicted, mission management process 122 includes route analysis and planning process 124, resource allocation process 126, and landing zone identification process 128. These processes are described in greater detail in the figures below.

Figure 2:
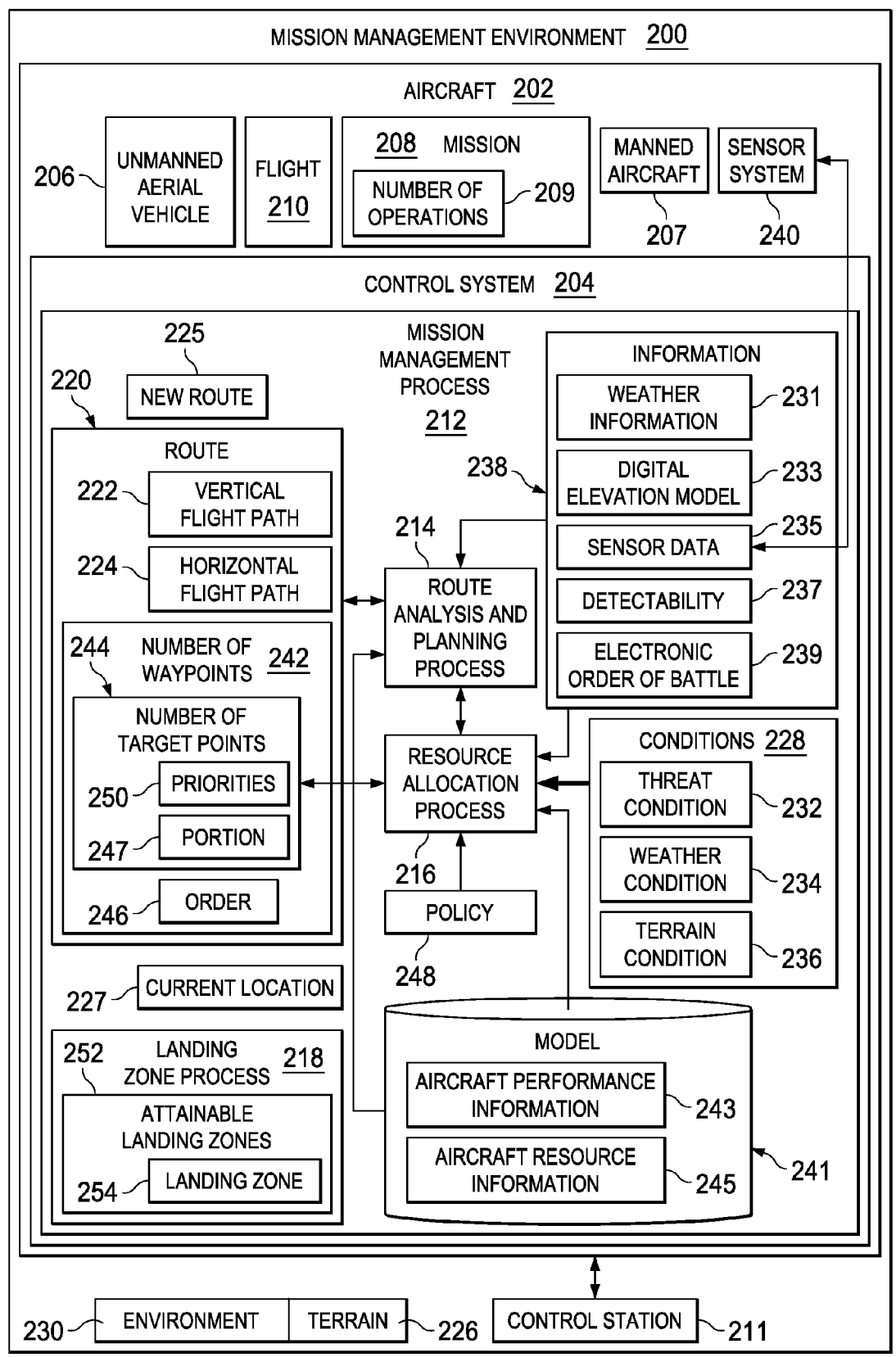
FIG. 2 is an illustration of a block diagram of a mission management environment in accordance with an advantageous embodiment.

With reference now to FIG. 2, an illustration of a block diagram of a mission management environment is depicted in accordance with an advantageous embodiment. In this illustrative example, mission management environment 100 in FIG. 1 is an example of one implementation for mission management environment 200 in FIG. 2.

Mission management environment 200 includes aircraft 202 and control system 204 in this illustrative example. Unmanned aerial vehicle 104, helicopter 106, aircraft 108, and aircraft 110 in FIG. 1 are examples of implementations for aircraft 202. In this illustrative example, aircraft 202 takes the form of unmanned aerial vehicle 206. In other illustrative examples, aircraft 202 may take the form of manned aircraft 207 or some other suitable type of aircraft.

As depicted, control system 204 may manage mission 208 for flight 210 of aircraft 202. Mission 208 may include performing number of operations 209. Number of operations 209 may include, for example, without limitation, surveillance, reconnaissance, target acquisition, target destruction, weapons deployment, security operations, and/or other suitable types of operations.

In this illustrative example, control system 204 may take a number of different forms. For example, without limitation, control system 204 may be selected from at least one of a processor unit, a computer with a processor unit, a processor unit with a number of hardware units, and an application specific integrated circuit.

In this depicted example, control system 204 is located in aircraft 202. However, in some illustrative examples, at least a portion of control system 204 may be located in control station 211. Control station 211 may be selected from at least one of a ground station, a ground vehicle, an aerial station, a satellite station, and/or some other suitable type of control station.

In this depicted example, mission management process 212 runs on control system 204. Depending on the implementation and configuration for control system 204, mission management process 212 may run onboard and/or off-board aircraft 202. Mission management process 212 is configured to plan and manage mission 208 for flight 210 of aircraft 202.

Mission management process 212 includes route analysis and planning process 214, resource allocation process 216, and landing zone process 218. These three processes are integrated in mission management process 212 to provide a capability for control system 204 to dynamically manage mission 208 for flight 210 of aircraft 202. In these examples, dynamically managing mission 208 involves managing mission 208 as mission 208 occurs during flight 210. In managing mission 208 as mission 208 occurs, the management may occur substantially in real-time and continuously during flight 210 of aircraft 202.

In this illustrative example, route analysis and planning process 214 manages route 220 for flight 210 of aircraft 202. Route 220 includes vertical flight path 222 and horizontal flight path 224. Vertical flight path 222 includes the various altitudes at which aircraft 202 will fly during flight 210. Horizontal flight path 224 includes the geographic coordinates through which aircraft 202 will fly during flight 210. These geographic coordinates may be in the form of, for example, latitude and longitude.

Route analysis and planning process 214 plans and manages route 220 to provide increased survivability and reduced undesired exposure of aircraft 202. For example, without limitation, route analysis and planning process 214 plans and manages route 220 based on terrain 226 over which aircraft 202 flies during flight 210.

Further, route analysis and planning process 214 plans and manages route 220 such that undesired exposure of aircraft 202 during flight 210 is reduced. Undesired exposure includes exposure to potential threats. Potential threats may include, for example, without limitation, electronic surveillance systems, hostile personnel, sensor systems in hostile environments, radar and/or optically guided missiles, anti-aircraft artillery, and/or other suitable types of threats.

As one illustrative example, route analysis and planning process 214 manages vertical flight path 222 for route 220 to reduce the possibility that hostile radar surveillance systems may detect aircraft 202 during flight 210. Further, route analysis and planning process 214 may manage route 220 based on terrain 226 over which aircraft 202 flies to reduce undesired detection of aircraft 202.

Additionally, route analysis and planning process 214 monitors conditions 228 in environment 230 around aircraft 202 during flight 210, while aircraft 202 is on route 220. In this illustrative example, conditions 228 may include, for example, without limitation, threat condition 232, weather condition 234, terrain condition 236, and/or other suitable conditions.

Route analysis and planning process 214 monitors conditions 228 in environment 230 using information 238. Information 238 includes weather information 231, digital elevation model 233, sensor data 235, detectability 237, electronic order of battle 239, and/or other suitable information. In these examples, digital elevation model 233 is a digital representation of terrain 226 over which aircraft 202 flies.

Detectability 237 includes radar cross-section data, an acoustic signature of aircraft 202, an optical signature of aircraft 202, visibility of aircraft 202 due to physical specifications and/or performance, and/or other information. Radar cross-section data is a measure of how detectable aircraft 202 is with respect to radar.

Electronic order of battle 239 includes an identification of locations of threats, characteristics of the threats, a prioritization of the threats, and/or other suitable information related to the threats. These threats may include, for example, without limitation, signal intelligence emitters that may be capable of detecting aircraft 202. Electronic order of battle 239 also includes an identification of communications intelligence and/or electronic signals intelligence that may pose a threat to aircraft 202. Electronic order of battle 239 may be updated during flight of aircraft 202 in response to threats that are identified during the flight.

In these illustrative examples, sensor data 235 is generated by sensor system 240. Sensor system 240 is associated with aircraft 202 in these examples. A first component may be considered to be associated with a second component by being secured to the second component, bonded to the second component, fastened to the second component, associated with the second component by a combination of the above, and/or connected to the second component in some other suitable manner. The first component also may be connected to the second component by using a third component. The first component may also be considered to be associated with the second component by being formed as part of and/or as an extension of the second component.

Additionally, route analysis and planning process 214 uses model 241 of aircraft 202 to manage route 220. Model 241 of aircraft 202 includes information about aircraft 202. In particular, model 241 of aircraft 202 includes aircraft performance information 243, aircraft resource information 245, and/or other suitable information. This other suitable information may include, for example, without limitation, specifications for aircraft 202, an identification of parts in aircraft 202, a manufacturer of aircraft 202, and/or other suitable information.

Aircraft performance information 243 includes aircraft kinematics information, performance capabilities in dead-stick mode, a maximum speed for aircraft 202, turning capabilities, energy use of aircraft 202, and/or other types of performance information. Aircraft resource information 245 includes information about fuel, engine power, available weapons, and/or other types of resource information.

In this illustrative example, resource allocation process 216 plans and manages number of waypoints 242 and number of target points 244 for route 220. Number of waypoints 242 includes locations identified along route 220 for flight 210. These waypoints may be defined in terms of geographic coordinates and/or altitude.

Number of target points 244 may be points within number of waypoints 242 along route 220 at which aircraft 202 performs number of operations 209. For example, without limitation, a target point may be a point at which aircraft 202 collects surveillance information, generates sensor information, deploys a weapon, attacks a target, or performs some other suitable operation.

Resource allocation process 216 determines order 246 for reaching number of target points 244 and/or number of waypoints 242. Further, resource allocation process 216 determines which portion of number of target points 244 are to be reached during flight 210 based on changes to route 220 made by route analysis and planning process 214. This determination may be based on conditions 228, model 241, information 238, and/or policy 248.

In this depicted example, policy 248 includes a number of rules for performing mission 208 during flight 210 of aircraft 202. For example, policy 248 may include a rule indicating a minimum number of target points in number of target points 244 required to be reached during a single flight of aircraft 202. Policy 248 may also identify priorities 250 for each of number of target points 244. These priorities may change during flight 210 as a function of time, changes in environment 230, changes to the objectives of mission 208, and/or other suitable factors.

Using policy 248, conditions 228, model 241, and route 220, resource allocation process 216 determines portion 247 of number of target points 244 to be reached during flight 210 and order 246 for portion 247 of number of target points 244. Order 246 and/or portion 247 are managed dynamically during flight 210 of aircraft 202.

Additionally, in response to a selection of portion 247 of number of target points 244 by resource allocation process 216, route analysis and planning process 214 may make changes to route 220. For example, route analysis and planning process 214 may change route 220 to new route 225 based on current location 227 of aircraft 202 and conditions 228.

In this illustrative example, landing zone process 218 identifies attainable landing zones 252 for aircraft 202 during flight 210. Attainable landing zones 252 may be identified by an operator of aircraft 202 prior to and/or during flight 210 in these examples.

Attainable landing zones 252 include locations along route 220 that may be reachable in a dead-stick mode and have terrain suitable for landing aircraft 202. In other words, attainable landing zones 252 include locations in which aircraft 202 can physically land. Further, attainable landing zones 252 also include landing zones in which aircraft 202 is less likely to be detected during landing.

During flight 210, landing zone process 218 may select landing zone 254 from attainable landing zones 252 and/or other landing zones in response to an in-flight situation. This in-flight situation may be, for example, an engine out, a problem with a critical aircraft system, low fuel, damage to aircraft 202, and/or some other type of situation.

With these types of situations, landing zone process 218 may select landing zone 254 to increase the possibility of recovery of aircraft 202 after landing. In some situations, landing zone 254 may be selected such that landing of aircraft 202 does not result in undesired collateral damage.

Further, landing zone process 218 may also select landing zone 254 in response to a need to self-destruct aircraft 202. For example, aircraft 202 may need to be destroyed during landing such that hostile personnel are unable to retrieve any part of aircraft 202. Landing zone process 218 may select landing zone 254 such that aircraft 202 may be undetected during landing and land in a location that will allow aircraft 202 to be completely destroyed.

The illustration of mission management environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, control system 204 may take the form of a number of computers. Further, in some examples, processes in addition to the processes described within mission management process 212 may run on control system 204 to manage mission 208 during flight 210 of aircraft 202.

Additionally, in other illustrative examples, mission management process 212 may manage a mission to be performed by more than one aircraft. For example, without limitation, at least a portion of mission management process 212 may run on a computer in control station 211 to manage mission 208 to be performed by aircraft 202 and two other aircraft. Further, mission management process 212 may manage multiple missions being performed by multiple aircraft.

Figure 3:
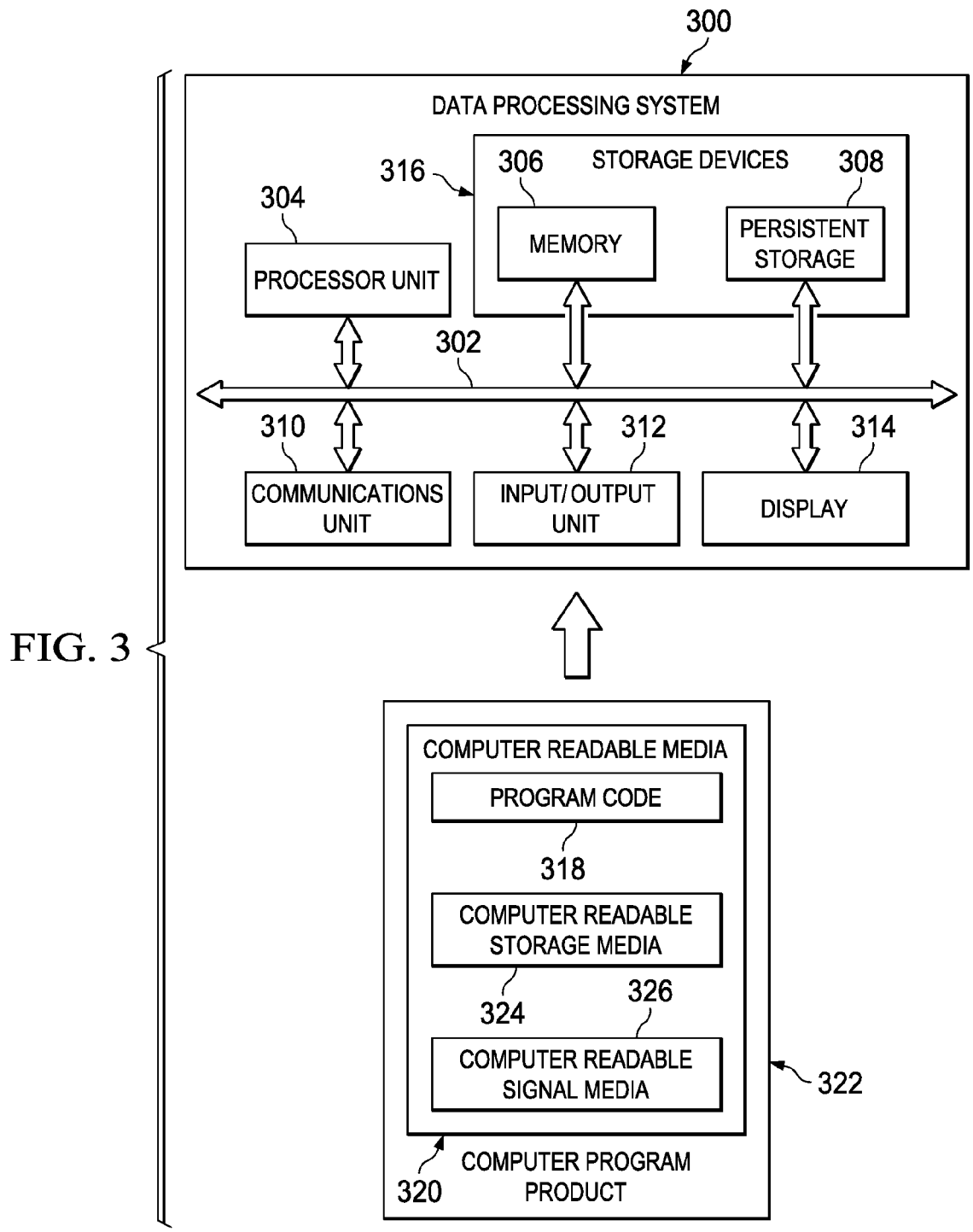
FIG. 3 is an illustration of a data processing system in accordance with an advantageous embodiment.

Turning now to FIG. 3, an illustration of a data processing system is depicted in accordance with an advantageous embodiment. In this illustrative example, data processing system 300 is an example of one implementation for control system 204 in FIG. 2. As depicted, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300.

In some instances, computer readable storage media 324 may not be removable from data processing system 300. In these illustrative examples, computer readable storage media 324 is a non-transitory computer readable storage medium.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communication links, such as wireless communication links, optical fiber cable, coaxial cable, a wire, and/or any other suitable type of communication link. In other words, the communication link and/or the connection may be physical or wireless in the illustrative examples.

In some advantageous embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300.

Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

Figure 4:
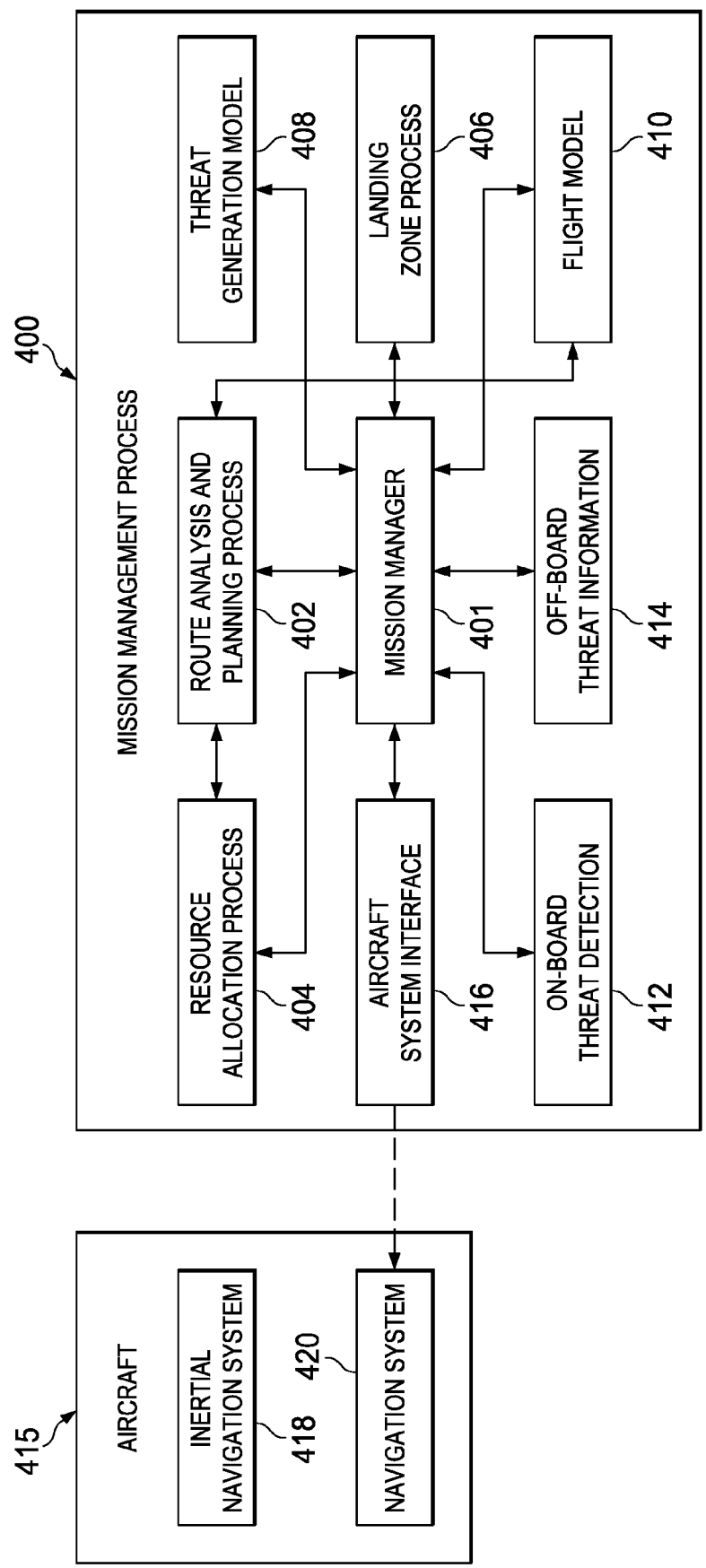
FIG. 4 is an illustration of a mission management process in accordance with an advantageous embodiment.

With reference now to FIG. 4, an illustration of a mission management process is depicted in accordance with an advantageous embodiment. Mission management process 400 is an example of one implementation for mission management process 212 in FIG. 2. Further, mission management process 400 may run on a computer, such as data processing system 300 in FIG. 3.

Mission management process 400 includes mission manager 401, route analysis and planning process 402, resource allocation process 404, landing zone process 406, threat generation model 408, flight model 410, on-board threat detection 412, and off-board threat information 414. As depicted, mission manager 401 integrates information from each of route analysis and planning process 402, resource allocation process 404, landing zone process 406, threat generation model 408, flight model 410, on-board threat detection 412, and off-board threat information 414 to manage a mission for aircraft 415.

In this illustrative example, mission manager 401 may exchange information with other systems on aircraft 415 using aircraft system interface 416. Aircraft system interface 416 may be a hardware and/or software interface in these examples.

As one illustrative example, aircraft system interface 416 allows mission manager 401 to receive information from inertial navigation system 418. Further, aircraft system interface 416 allows mission manager 401 to send information to navigation system 420. For example, mission manager 401 may send updated route information to navigation system 420 substantially in real-time and continuously during the flight of aircraft 415.

Threat generation model 408 includes information about potential threats. For example, for a surface to air missile threat, threat generation model 408 may include a frequency of the radar associated with the missile, the type of seeker, a footprint range, and/or other suitable information about the surface to air missile threat.

Flight model 410 is an example of one implementation for model 241 in FIG. 2. Flight model 410 includes information, such as, without limitation, aircraft performance information, aircraft resource information, aircraft specifications, and/or other suitable information.

In this illustrative example, on-board threat detection 412 comprises an identification of potential threats detected using sensor systems on-board aircraft 415 in this example. For example, on-board threat detection 412 may include an identification of potential threats made using video camera systems, radar systems, infrared systems, and/or other suitable types of on-board sensor systems.

Off-board threat information 414 comprises information provided by a source off-board aircraft 415. For example, off-board threat information 414 may include information provided by a control station, surveillance aircraft, communications intelligence, signals intelligence, foot soldiers performing surveillance, and/or other off-board sources.

Figure 5:
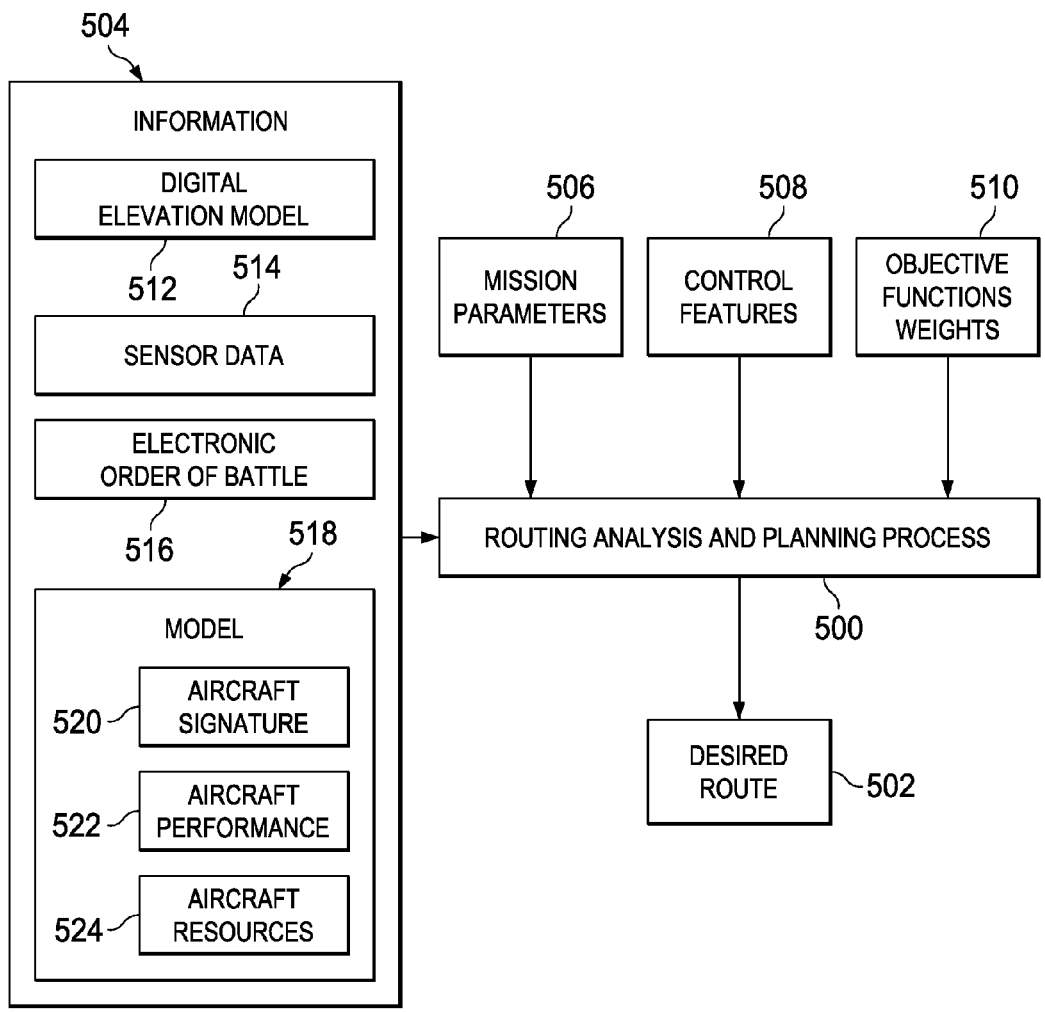
FIG. 5 is an illustration of a routing analysis and planning process in accordance with an advantageous embodiment.

With reference now to FIG. 5, an illustration of a routing analysis and planning process is depicted in accordance with an advantageous embodiment. In this illustrative example, routing analysis and planning process 500 is an example of one implementation for route analysis and planning process 214 in FIG. 2.

Routing analysis and planning process 500 forms desired route 502 based on various sources of information. Desired route 502 is an example of one implementation for route 220 in FIG. 2.

Routing analysis and planning process 500 uses information 504, mission parameters 506, control features 508, and objective functions weights 510 to form desired route 502. Information 504 may be an example of information 238 in FIG. 2. Information 504 includes digital elevation model 512, sensor data 514, electronic order of battle 516, and model 518. Electronic order of battle 516 includes an identification of threats and information about the threats that may be encountered during the mission. Model 518 includes aircraft signature 520, aircraft performance 522, and aircraft resources 524.

In this illustrative example, mission parameters 506 include, for example, without limitation, a beginning fuel level, time constraints, a minimum altitude above ground at which the aircraft can fly, and/or other suitable parameters. Mission parameters 506 may be selected based on the type of mission for the aircraft, safety guidelines, and/or other suitable factors. For example, flying below the minimum altitude for the aircraft may reduce the safety of the aircraft, reduce performance of the aircraft, and/or generate errors in the geospatial data obtained by the aircraft.

Control features 508 are geospatial features that control how routing analysis and planning process 500 forms desired route 502. For example, control features 508 may include geospatial polygons and/or closed polygonal chains that represent areas that should be avoided by the aircraft during flight. A closed polygonal chain is a series of line segments that are connected such that the first vertex and the last vertex coincide or are connected by a line segment. In other illustrative examples, control features 508 may also include other types of polygonal chains. Control features 508 also may include features that are used to form desired route 502 within a particular area.

For example, if a mission indicates that a target point is to be approached by an aircraft from a given heading, a closed polygonal chain in control features 508 may be generated around the target point to indicate that the desired route for the aircraft should fall within the closed polygonal chain that is generated. In particular, the closed polygonal chain that is generated may be a bottle-shaped polygonal chain in which the aircraft is to approach the target point from the opening of the bottle-shaped polygonal chain.

In this illustrative example, routing analysis and planning process 500 forms desired route 502 based on a number of objective functions. These objective functions include, for example, distance, fuel usage, detection, and threat exposure. Routing analysis and planning process 500 uses relative weightings for these objective functions to form desired route 502. The relative weightings for the objective functions may be based on the type of mission, the type of aircraft, and/or other suitable factors.

For example, when performing covert missions, detection may be more important and have a greater weight than fuel usage. When performing other types of missions, survivability of the aircraft may be more important than detection. With these types of missions, distance and fuel usage may have greater weights as compared to detection.

Further, in this illustrative example, routing analysis and planning process 500 uses Dijkstra's algorithm to form desired route 502. Of course, in other illustrative examples, other algorithms, techniques, and/or methods may be used to form desired route 502.

Figure 6:
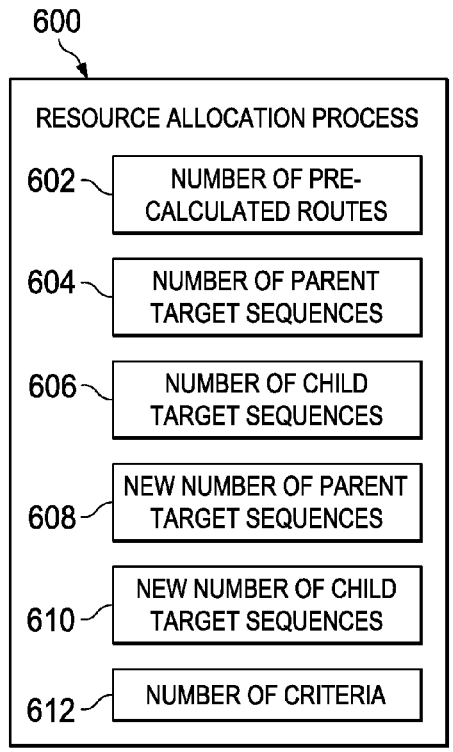
FIG. 6 is an illustration of a resource allocation process in accordance with an advantageous embodiment.

With reference now to FIG. 6, an illustration of a resource allocation process is depicted in accordance with an advantageous embodiment. In this illustrative example, resource allocation process 600 is an example of one implementation for resource allocation process 216 in FIG. 2.

As depicted in this example, resource allocation process 600 generates number of pre-calculated routes 602. Each of number of pre-calculated routes 602 identifies a path between two target points. Number of pre-calculated routes 602 is generated prior to flight of the aircraft.

In this illustrative example, resource allocation process 600 uses number of pre-calculated routes 602 to generate number of parent target sequences 604. Each target sequence is an identification and order for the target points. Resource allocation process 600 uses number of parent target sequences 604 to generate number of child target sequences 606. Number of child target sequences 606 may be generated using a number of different methods.

For example, a child target sequence in number of child target sequences 606 may be formed by combining portions of target sequences from two parent target sequences in number of parent target sequences 604. In another example, a child target sequence may be formed by making any number of changes to a single parent target sequence. These changes may include, for example, adding a new target point to the parent target sequence, removing a target point from the parent target sequence, reversing the order of at least a portion of the parent target sequence, and/or other types of changes.

Number of parent target sequences 604 and number of child target sequences 606 are then evaluated by resource allocation process 600 based on a number of factors. These factors include, without limitation, a value for the target points in a sequence, time to complete the mission with the sequence, fuel usage, and/or other suitable factors.

The value of the target point may depend on the operations to be performed at the target point. For example, the value of the target point may be based on factors including, without limitation, the type of target, the type of weapon to be used, the type of sensor to be used, the survivability of the aircraft while performing the operations at the target point, and/or other suitable factors.

Based on the evaluation of number of parent target sequences 604 and number of child target sequences 606, resource allocation process 600 ranks the target sequences. Further, based on this ranking, resource allocation process 600 selects a portion of the target sequences to create new number of parent target sequences 608. New number of parent target sequences 608 is used to create new number of child target sequences 610.

Additionally, the process of evaluating the target sequences is repeated for new number of parent target sequences 608 and new number of child target sequences 610. This evaluation may be performed using any number of factors. For example, the evaluation may be performed based on the factors described above and/or additional factors.

This process may be repeated a number of times until a target sequence that meets number of criteria 612 is identified. Number of criteria 612 may include, for example, time constraints for the mission, constraints for fuel usage, a minimum value for the different target points in the sequence, and/or other suitable criteria.

Figure 7:
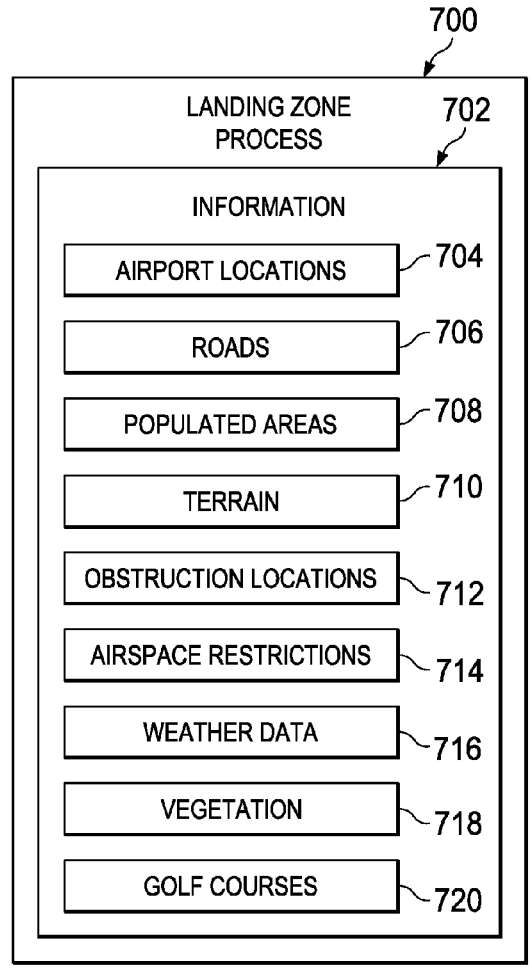
FIG. 7 is an illustration of a landing zone process in accordance with an advantageous embodiment.

With reference now to FIG. 7, an illustration of a landing zone process is depicted in accordance with an advantageous embodiment. In this illustrative example, landing zone process 700 is an example of one implementation for landing zone process 218 in FIG. 2.

Landing zone process 700 uses information 702 to select landing zones for an aircraft. Information 702 includes airport locations 704, roads 706, populated areas 708, terrain 710, obstruction locations 712, airspace restrictions 714, weather data 716, vegetation 718, golf courses 720, and/or other suitable information.

Landing zone process 700 uses information 702 to select landing zones for an aircraft based on a number of factors. These factors may include, for example, the possibility for successful recovery of the aircraft. Further, landing zone process 700 may select the landing zone to reduce potential collateral damage.

Figure 8:
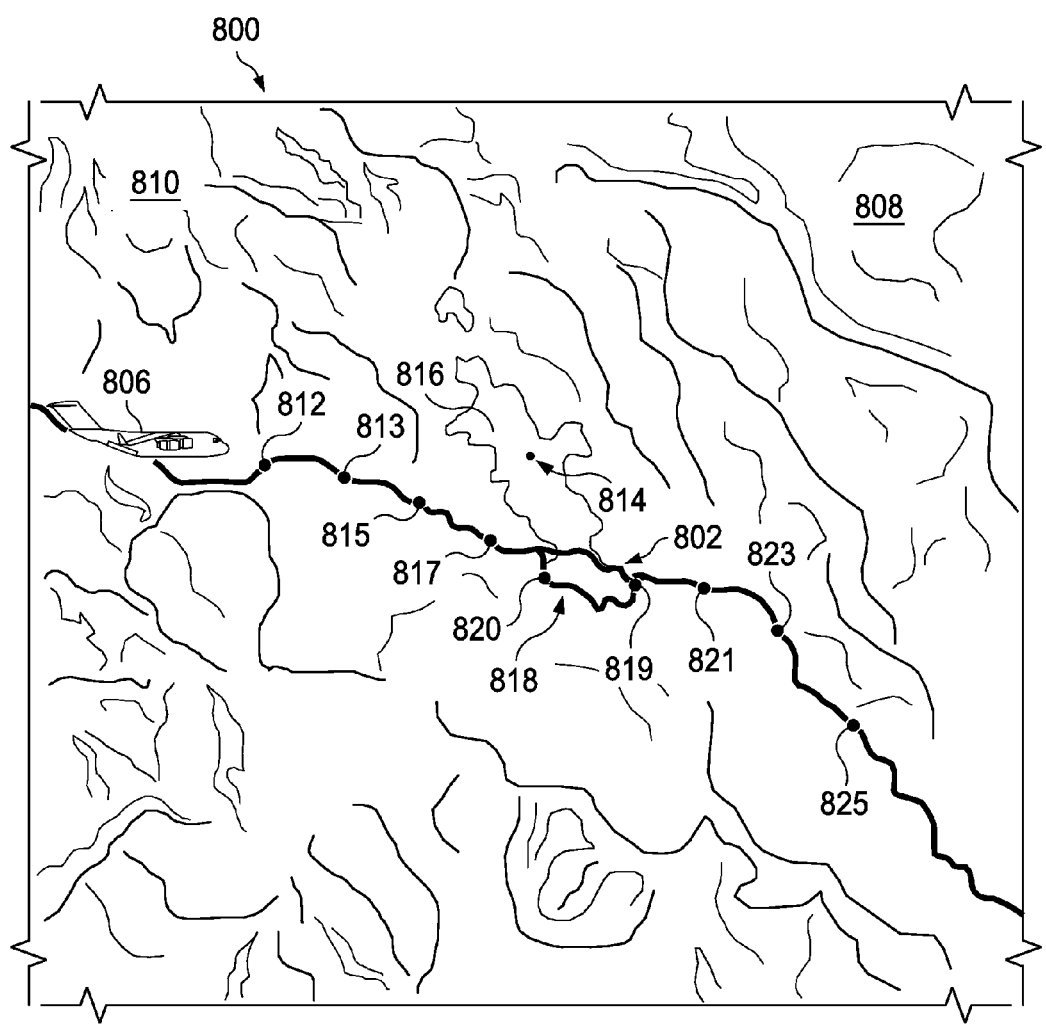
FIG. 8 is an illustration of a map identifying routes for an aircraft in accordance with an advantageous embodiment.

With reference now to FIG. 8, an illustration of a map identifying routes for an aircraft is depicted in accordance with an advantageous embodiment. In this illustrative example, map 800 presents route 802 for aircraft 806. Route 802 is an example of a route that may be planned for aircraft 806 prior to flight of aircraft 806.

Route 802 is planned using, for example, mission management process 212 in FIG. 2. Route 802 is planned for aircraft 806 to perform a surveillance mission in this illustrative example. Further, route 802 is planned based on known threat area 808 over terrain 810. Known threat area 808 is an area in which threats have been identified. Route 802 is planned by the mission management process to increase survivability of aircraft 806 and reduce undesired exposure of aircraft 806 to the known threats.

As depicted, route 802 has target points 812, 813, 815, 817, 819, 821, 823, and 825 along route 802. These target points are locations at which aircraft 806 is to collect surveillance data. For example, the mission for aircraft 806 may include generating images of terrain 810 at the different target points along route 802. As a more specific example, aircraft 806 may generate an image of terrain 810 at target point 813.

In this illustrative example, aircraft 806 identifies threat 814 during flight. The mission management process identifies pop-up threat area 816 for threat 814. Pop-up threat area 816 is the area in which aircraft 806 may have decreased survivability and/or an increased possibility of detection.

The mission management process may then change route 802 to new route 818. New route 818 includes target point 820. As depicted, new route 818 for aircraft 806 avoids pop-up threat area 816. In this manner, new route 818 increases survivability for aircraft 806 and reduces exposure of aircraft 806 to threat 814.

Figure 9:
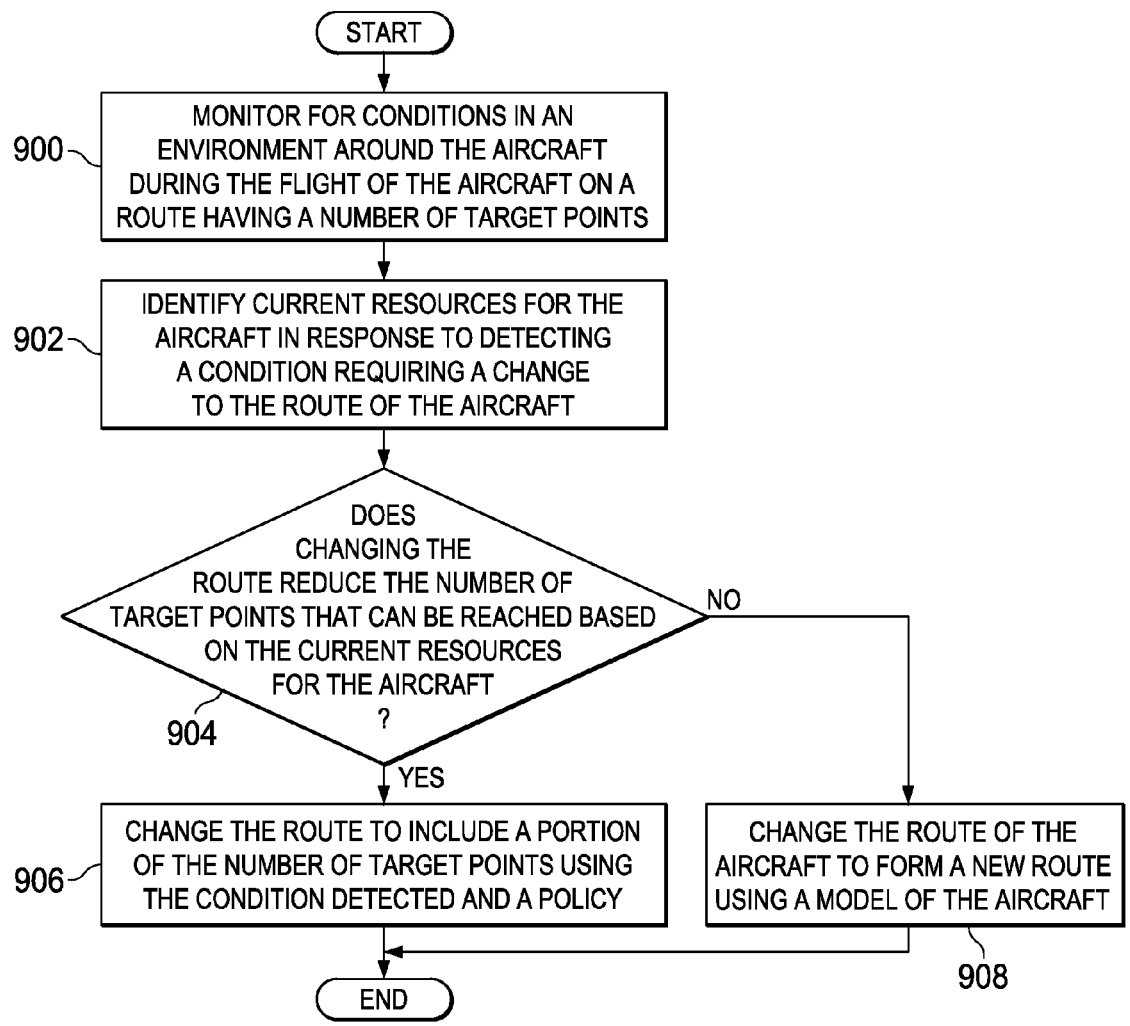
FIG. 9 is an illustration of a flowchart of a process for managing a flight of an aircraft in accordance with an advantageous embodiment.

With reference now to FIG. 9, an illustration of a flowchart of a process for managing a flight of an aircraft is depicted in accordance with an advantageous embodiment. The process illustrated in FIG. 9 may be implemented in mission management environment 200 in FIG. 2. In particular, this process may be implemented using mission management process 212 running on control system 204 in FIG. 2.

The process begins by monitoring for conditions in an environment around the aircraft during the flight of the aircraft on a route having a number of target points (operation 900). The aircraft may perform a number of operations for a mission during the flight of the aircraft. The number of operations may be performed at the number of target points along the route. The conditions may include at least one of a weather condition, a threat condition, a terrain condition, or some other suitable type of condition.

Thereafter, the process identifies current resources for the aircraft in response to detecting a condition requiring a change to the route of the aircraft (operation 902). Current resources may include a fuel level, engine power, available weapons, and/or other types of resources. The condition may be one of a weather condition, a threat condition, a terrain condition, or some other suitable type of condition.

The process then determines whether changing the route reduces the number of target points that can be reached based on the current resources for the aircraft (operation 904). If changing the route reduces the number of target points that can be reached, the process changes the route to include a portion of the number of target points using the condition detected and a policy (operation 906), with the process terminating thereafter. Otherwise, if changing the route does not reduce the number of target points that can be reached, the process changes the route of the aircraft to form a new route using a model of the aircraft (operation 908), with the process terminating thereafter.

The process illustrated in FIG. 9 may be repeated continuously during the flight of the aircraft in this illustrative example. In other illustrative examples, this process may be repeated in response to a periodic event occurring. The event may be, for example, the lapse of a selected period of time.

Figure 10:
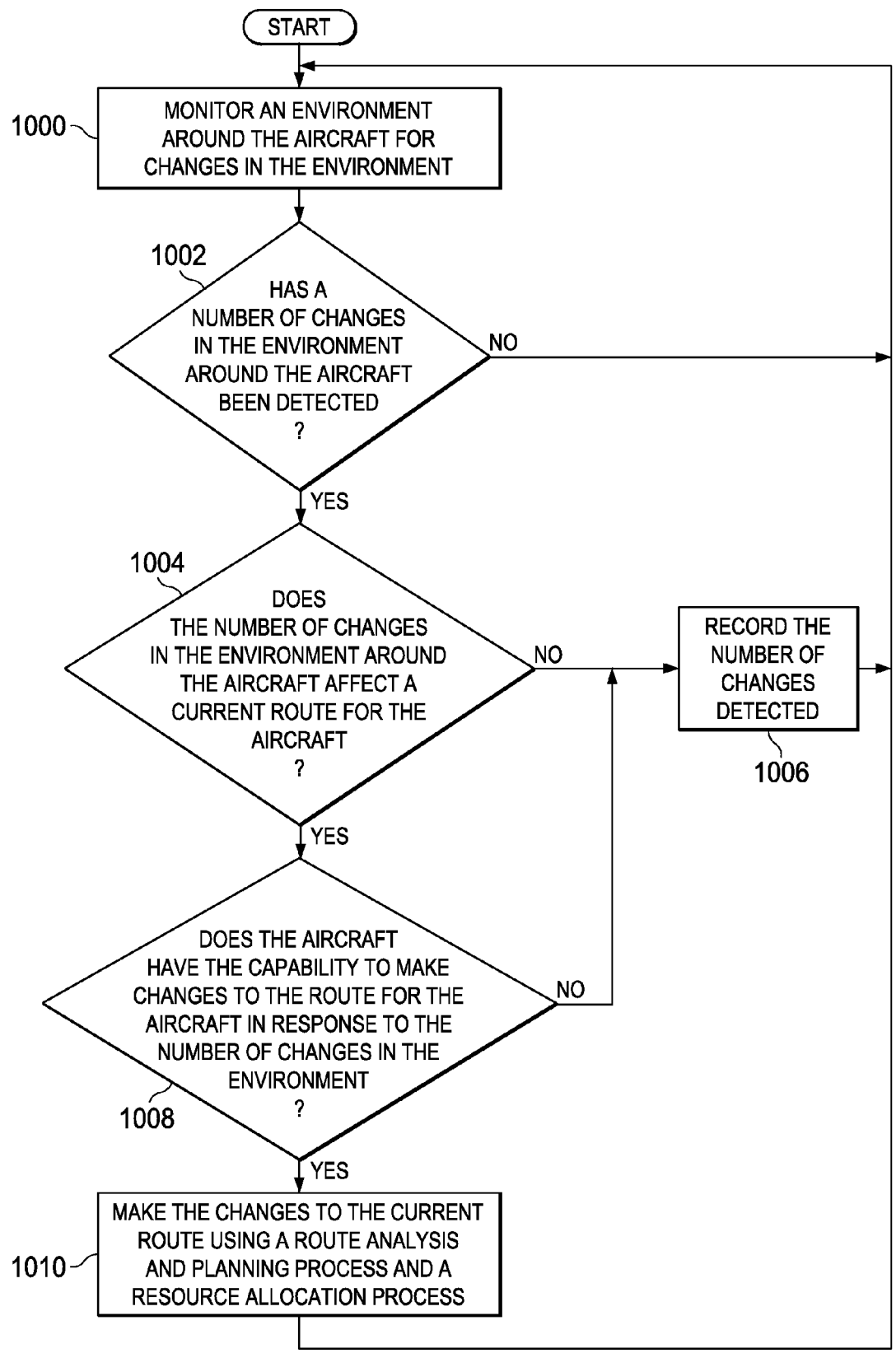
FIG. 10 is an illustration of a flowchart of a process for managing a mission during a flight of an aircraft in accordance with an advantageous embodiment.

With reference now to FIG. 10, an illustration of a flowchart of a process for managing a mission during a flight of an aircraft is depicted in accordance with an advantageous embodiment. The process illustrated in FIG. 10 may be implemented in mission management environment 200 in FIG. 2. In particular, this process may be implemented using mission management process 212 running on control system 204 in FIG. 2.

The process begins by monitoring an environment around the aircraft for changes in the environment (operation 1000). Operation 1000 is performed using information, such as information 238 in FIG. 2. For example, this information may include weather information, a digital elevation model, sensor data, aircraft detectability information, an electronic order of battle, and/or other suitable types of information. Further, other types of information about the environment around the aircraft may be used in performing operation 1000. Additionally, the information used to monitor for the conditions in the environment is obtained from systems on-board and/or off-board the aircraft.

The process determines whether a number of changes in the environment around the aircraft have been detected (operation 1002). In operation 1002, more than one change may be detected at a time. If a number of changes in the environment around the aircraft have not been detected, the process returns to operation 1000 as described above.

Otherwise, if a number of changes in the environment around the aircraft has been detected, the process determines whether the number of changes in the environment around the aircraft affect a current route for the aircraft (operation 1004). This determination is made by performing a real-time analysis of the number of changes detected and parameters for the number of operations to be performed for a mission of the aircraft. For example, operation 1004 may determine whether the number of changes detected in the environment affect the current route for the mission. As one illustrative example, a thunderstorm detected along the route for the aircraft indicates that the route for the aircraft should be changed.

If a determination is made that the number of changes detected do not affect the current route for the aircraft, the process then records the number of changes detected (operation 1006). Recording the number of changes detected also includes recording a time for when and/or a location for where the number of changes is detected. Then, the process returns to operation 1000 as described above.

Otherwise, if the number of changes detected does affect the current route for the aircraft, the process determines whether the aircraft has the capability to make changes to the route for the aircraft in response to the number of changes in the environment (operation 1008). This determination is made using a model of the aircraft, such as model 241 in FIG. 2. The model may include aircraft performance information and aircraft resource information.

If the aircraft does not have the capability to make changes to the route for the aircraft in response to the number of changes, the process proceeds to operation 1006 as described above. Otherwise, if the aircraft does have the capability to make the changes to the route for the aircraft in response to the number of changes, the process makes the changes to the current route using a route analysis and planning process and a resource allocation process (operation 1010), with the process then returning to operation 1000 as described above.

The route analysis planning process may be route analysis and planning process 214 in FIG. 2. The resource allocation process may be resource allocation process 216 in FIG. 2. The new route may be formed using information, such as information 238 in FIG. 2 and information 504 in FIG. 5. Further, the new route may be formed using, for example, mission parameters 506, control features 508, and objective functions weights 510 in FIG. 5.

In this manner, a new route is selected for the aircraft that takes into account the number of changes detected in the environment. In some illustrative examples, operation 1010 may use a landing zone process, such as landing zone process 218 in FIG. 2, to make the changes to the route for the aircraft when the number of changes in the environment indicates that the aircraft should land.

Figure 11:
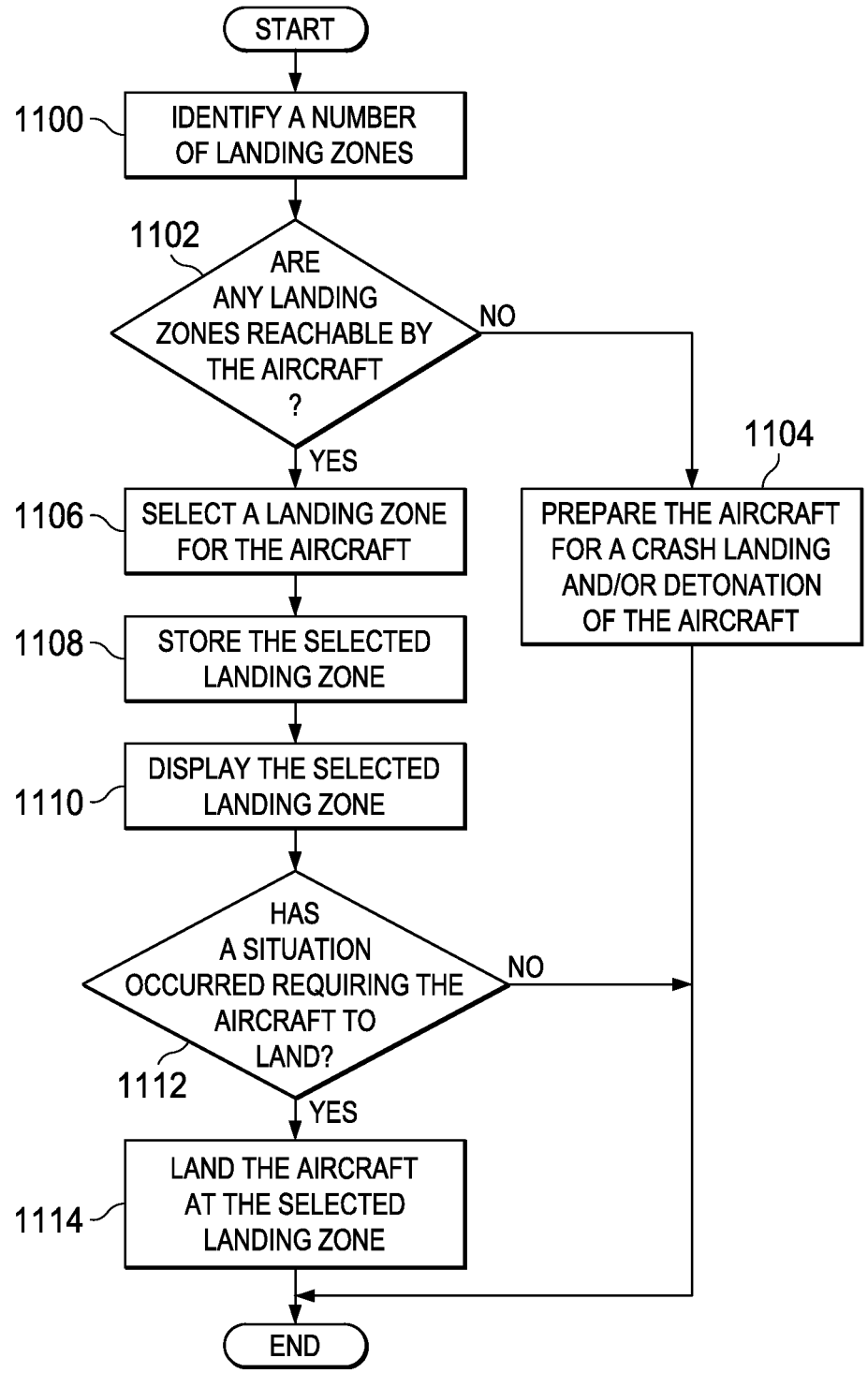
FIG. 11 is an illustration of a flowchart of a process for selecting a landing zone in accordance with an advantageous embodiment.

With reference now to FIG. 11, an illustration of a flowchart of a process for selecting a landing zone is depicted in accordance with an advantageous embodiment. The process illustrated in FIG. 11 may be implemented using mission management process 212 running on control system 204 in FIG. 2. In particular, this process may be implemented using landing zone process 218 in FIG. 2. Further, this process may be implemented at different points along the flight path of an aircraft.

The process begins by identifying a number of landing zones (operation 1100). In operation 1100, the number of landing zones may be identified using, for example, information 702 in FIG. 7. The process determines whether any landing zones in the number of landing zones identified are reachable by the aircraft (operation 1102).

If no landing zones are reachable by the aircraft, the process prepares the aircraft for a crash landing and/or detonation of the aircraft (operation 1104), with the process terminating thereafter. The aircraft is prepared for the crash landing and/or detonation of the aircraft even if a crash landing is not required at the current point in time.

Otherwise, in operation 1102, if any of the landing zones are reachable by the aircraft, the process selects a landing zone for the aircraft (operation 1106). In operation 1106, if only one landing zone is reachable, that landing zone is selected. If more than one landing zone is reachable, the landing zone for the aircraft may be selected based on a number of factors. These factors may include, for example, aero-kinematic performance of the aircraft.

Thereafter, the process stores the selected landing zone (operation 1108). Next, the process displays the selected landing zone (operation 1110). The process then determines whether a situation has occurred requiring the aircraft to land (operation 1112).

If a situation has occurred, the process lands the aircraft at the selected landing zone (operation 1114), with the process terminating thereafter. Otherwise, in operation 1112, if a situation has not occurred, the process terminates.

The process illustrated in FIG. 11 may be repeated at every waypoint encountered during flight of the aircraft. In some illustrative examples, this process may be repeated every time a selected distance is passed during flight of the aircraft. For example, the process may be repeated every five miles or every 10 miles during the flight of the aircraft.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a flight of an aircraft, the method comprising:
    monitoring for conditions in an environment around the aircraft during the flight of the aircraft on a route having a number of target points;
    responsive to detecting a condition requiring a change to the route of the aircraft, identifying current resources for the aircraft;
    determining whether changing the route reduces the number of target points that can be reached based on the current resources for the aircraft; and
    responsive to a determination that changing the route reduces the number of target points that can be reached, changing the route to include a portion of the number of target points using the condition and a policy.

2. The method of claim 1 further comprising:
    responsive to an absence of the determination that changing the route reduces the number of target points that can be reached, changing the route of the aircraft to form a new route using a model of the aircraft.

3. The method of claim 1 further comprising:
    determining whether a destination waypoint in the route can be reached by the aircraft with the current resources for the aircraft; and
    responsive to a determination that the destination waypoint in the route cannot be reached with the current resources for the aircraft, selecting a landing zone for the aircraft.

4. The method of claim 3, wherein the step responsive to the determination that the destination waypoint in the route cannot be reached with the current resources for the aircraft, for selecting the landing zone for the aircraft comprises:
    identifying information about a number of attainable landing areas for the aircraft based on requirements for a desired landing zone.

5. The method of claim 4, wherein the desired landing zone decreases a likelihood that the aircraft will be at least one of captured and destroyed by hostile personnel.

6. The method of claim 1, wherein the step responsive to the determination that changing the route reduces the number of target points that can be reached, for changing the route to include the portion of the number of target points using the condition and the policy comprises:
    selecting the portion of the number of target points using the condition and the policy; and
    generating a new route from a current location of the aircraft to the number of target points.

7. The method of claim 6, wherein the step of generating the new route from the current location of the aircraft to the number of target points comprises:
    selecting an order for the portion of the number of target points; and
    generating the new route from the current location of the aircraft to the number of target points using the condition, the policy, the current resources for the aircraft, and a model of the aircraft.

8. The method of claim 7, wherein the step of generating the new route from the current location of the aircraft to the number of target points using the condition, the policy, the current resources for the aircraft, and the model of the aircraft comprises:
    generating the new route from the current location of the aircraft to the number of target points using the condition, the policy, the current resources for the aircraft, and the model of the aircraft using Dijkstra's algorithm.

9. The method of claim 1, wherein the policy specifies using a second route having an altitude and path through terrain that reduces detection of the aircraft.

10. The method of claim 1, wherein the step of monitoring for the conditions in the environment around the aircraft during the flight of the aircraft on the route having the number of target points comprises:
    monitoring for the conditions in the environment around the aircraft during the flight of the aircraft on the route having the number of target points using a sensor system associated with the aircraft.

11. The method of claim 1, wherein the policy identifies a priority for each of the number of target points.

12. The method of claim 1, wherein the condition is selected from one of a threat to the aircraft, an environmental condition, and a weather condition.

13. The method of claim 1, wherein the aircraft is selected from one of a manned aircraft and an unmanned aerial vehicle.

14. An apparatus comprising:
    an aircraft; and
    a control system associated with the aircraft, wherein the control system is configured to monitor for conditions in an environment around the aircraft during flight of the aircraft on a route having a number of target points; identify current resources for the aircraft in response to detecting a condition requiring a change to the route of the aircraft; determine whether changing the route reduces the number of target points that can be reached based on the current resources for the aircraft; and change the route to include a portion of the number of target points using the condition and a policy in response to a determination that changing the route reduces the number of target points that can be reached.

15. The apparatus of claim 14, wherein the control system is further configured to change the route of the aircraft to form a new route using a model of the aircraft in response to an absence of the determination that changing the route reduces the number of target points that can be reached.

16. The apparatus of claim 14, wherein the control system is further configured to determine whether a destination waypoint in the route can be reached by the aircraft with the current resources for the aircraft; and select a landing zone for the aircraft in response to a determination that the destination waypoint in the route cannot be reached with the current resources for the aircraft.

17. The apparatus of claim 16, wherein in selecting the landing zone for the aircraft in response to the determination that the destination waypoint in the route cannot be reached with the current resources for the aircraft, the control system is configured to identify information about a number of attainable landing areas for the aircraft based on requirements for a desired landing zone.

18. The apparatus of claim 17, wherein the desired landing zone decreases a likelihood that the aircraft will be at least one of captured and destroyed by an enemy.

19. The apparatus of claim 14, wherein in changing the route to include the portion of the number of target points using the condition and the policy in response to the determination that changing the route reduces the number of target points that can be reached, the control system is configured to select the portion of the number of target points using the condition and the policy; and generate a new route from a current location of the aircraft to the number of target points.

20. The apparatus of claim 19, wherein in generating the new route from the current location of the aircraft to the number of target points, the control system is configured to select an order for the portion of the number of target points; and generate the new route from the current location of the aircraft to the number of target points using the condition, the policy, the current resources for the aircraft, and a model of the aircraft.

21. The apparatus of claim 20, wherein in generating the new route from the current location of the aircraft to the number of target points using the condition, the policy, the current resources for the aircraft, and the model of the aircraft, the control system is configured to generate the new route from the current location of the aircraft to the number of target points using the condition, the policy, the current resources for the aircraft, and the model of the aircraft using Dijkstra's algorithm.

22. The apparatus of claim 14, wherein the policy specifies using a desired route having an altitude and path through terrain that reduces detection of the aircraft.

23. The apparatus of claim 14 further comprising:
a sensor system associated with the aircraft, wherein the sensor system is configured to generate information used by the control system to monitor for the conditions in the environment around the aircraft during the flight of the aircraft on the route having the number of target points.

24. The apparatus of claim 14, wherein the policy identifies a priority for each of the number of target points.

25. The apparatus of claim 14, wherein the condition is selected from one of a threat to the aircraft, an environmental condition, and a weather condition.

26. The apparatus of claim 14, wherein the aircraft is selected from one of a manned aircraft and an unmanned aerial vehicle.

27. The apparatus of claim 14, wherein the control system is selected from at least one of a processor unit, a computer with the processor unit, the processor unit with a number of hardware units, and an application specific integrated circuit.

* * * * *